(12) United States Patent
Pfeil et al.

(10) Patent No.: US 6,533,503 B2
(45) Date of Patent: Mar. 18, 2003

(54) MORTAR COMPOSITION, CURABLE BY FRONTAL POLYMERIZATION, AND A METHOD FOR FASTENING TIE BARS

(75) Inventors: Armin Pfeil, Kaufering (DE); Thomas Bürgel, Landsberg am Lech (DE); Massimo Morbidelli, Zurich (CH); Anny Rosell, Zurich (CH)

(73) Assignee: Hilti Aktiengesellschaft, Liechtenstein ( * ) Notice: Subject to any disclaimer, the term of this patent is extended or adjusted under 35 U.S.C. 154(b) by 5 days.

(21) Appl. No.: 09/746,628

(22) Filed: Dec. 21, 2000

(65) Prior Publication Data

US 2001/0018880 A1 Sep. 6, 2001

(30) Foreign Application Priority Data

Jan. 20, 2000 (DE) .......................................... 100 02 367

(51) Int. Cl.⁷ .............................................. E21D 20/02
(52) U.S. Cl. ................. 405/259.5; 405/259.1; 405/259.2; 405/259.3; 405/259.4; 524/819; 524/832; 524/849; 523/466
(58) Field of Search .......................... 405/259.1, 259.2, 405/259.3, 259.4, 259.5, 262; 523/466; 524/819, 832, 849

(56) References Cited

U.S. PATENT DOCUMENTS 6,057,406 A * 5/2000 Pojman ....................... 526/87

* cited by examiner

*Primary Examiner*—Robert Dawson
*Assistant Examiner*—D. Aylward
(74) *Attorney, Agent, or Firm*—Sidley Austin Brown & Wood, LLP

(57) ABSTRACT

A mortar composition, curable by frontal polymerization after heat initiation, is described, wherein are contained a) at least one polymerizable monomer and/or at least one curable resin, b) at least one polymerization initiator, which can be activated and/or released thermally at a temperature above 30° C., for the polymerizable monomers and/or curing accelerator for the curable resin and c) optionally at least one filler, the nature and amount of polymerizable monomer or curable resin and polymerization initiator or curing accelerator being selected so that a polymerization front velocity of at least 10 cm/min results after the polymerization is initiated, as well as a method for fastening tie bars, reinforcing steel or the like in solid substrates.

21 Claims, 1 Drawing Sheet

MORTAR COMPOSITION, CURABLE BY FRONTAL POLYMERIZATION, AND A METHOD FOR FASTENING TIE BARS

FIELD OF INVENTION

The object of the present invention is a mortar composition, which can be cured after thermal initiation by frontal polymerization, as well as a method for fastening tie bars, reinforcing steel or the like in solid substrates using this mortar composition.

BACKGROUND INFORMATION AND PRIOR ART

In order to fasten tie bars, reinforcing iron or similar elements in a borehole in mineral substrates, such as concrete or masonry, two-component mortar compositions based on methacrylate or epoxide resins are normally used. After the mutually reacting components are mixed, these mortar compositions have a certain pot life, during which the element, which is to be fastened, can be set, and reach their final strength at the expiration of a further time period. Under usual conditions, said pot life lies within the range of a few minutes. Normally, curing takes place within a few minutes to hours. In every case, both effects are interlinked, that is, a longer pot life leads to a longer curing time, and these times can vary depending on the surrounding conditions, particularly the temperature.

On building sites, where such fastening elements usually are set, it is hardly possible to work under optimum conditions. Therefore, when a plurality of boreholes, for example, initially are filled with a mortar composition and the fastening elements are then introduced one after the other, different time periods elapse between the mixing of the curing mortar mixture and the introduction of the fastening elements. This can lead to premature curing of the mortar composition, so that the borehole no longer can be used. This is critical, above all, at high temperatures (in the summer).

There is therefore a need for a mortar composition, which has a very long pot life and the curing of which can be initiated selectively at a desired time. By these means, it became possible initially to provide a large number of boreholes with the mortar composition, subsequently to introduce and adjust the fastening elements and then to initiate the curing, as a result of which it becomes possible to attain an optimum and largely identical curing and, with that, largely identical pull-out strengths of the fastening elements that have been mounted.

The free radical frontal polymerization has already been described by J. A. Pojman et al. (J. Chem. Soc. Faraday Trans. (1996), 2825–2837). It is stated that, under certain conditions, the heat, released by a polymerization reaction, can be used to stimulate the polymerization of adjacent monomer regions. It is, however, stipulated that the frontal polymerization takes place with good thermal insulation and that the front, in order to avoid interfering convection effects, spreads out downward because of gravity. The synthesis of materials as well as the curing of large volumes of composite materials is described as the purpose for which frontal polymerization is used.

OBJECT OF THE INVENTION

The object of the present invention is to provide a mortar composition, with which it is possible to separate the pot life from the curing time of the mortar composition and, with that, to place the fastening elements into the boreholes optionally even hours after the mortar composition is introduced, to align them and then by thermal initiation to bring about the curing within seconds up to a few minutes, so that it is readily possible, even under the heat-conducting conditions of the chemical anchoring of primarily metallic fastening element in mineral substrates, such as concrete, masonry and the like, to bring about a selective curing of the mortar composition in the dowel holes of fastening elements. It is a further object of the present invention to provide a method for using such a mortar composition to fasten fastening elements, especially tie bars, reinforcing steel or the like, in solid substrates.

SUMMARY OF THE INVENTION

These objectives are accomplished by the mortar composition of claims 1 to 17 and the method for fastening tie bars, reinforcing steel or the like in solid substrates using this mortar composition is accomplished in accordance with claims 18 to 21.

The object of the invention therefore is, in particular, a mortar composition, which can be cured after thermal initiation by frontal polymerization and is characterized by containing a) at least one polymerizable monomer and/or at least one curable resin,
b) at least one polymerization initiator, which can be activated and/or released thermally at a temperature above 30° C., for the polymerizable monomer and/or curing accelerator for the curable resin and
c) optionally at least one filler, the nature and amount of polymerizable monomer or curable resin and polymerization initiator or curing accelerator being selected so that a polymerization front velocity of at least 10 cm/min results after the polymerization is initiated.

The inventive mortar composition cures only when, due to thermal initiation, that is, due to pointwise or two-dimensional heating of the surface layer or by heating the interior of the mortar composition to a temperature above 30° C., the polymerization initiator or curing accelerator, which can be activated and/or released thermally, is activated and the polymerization of the monomer and/or of the curable resin is initiated. By these means, it becomes possible to attain a mortar pot life of practically any length and to separate this pot life completely from the curing time, since the curing sets in only as the result of the thermal initiation. In this way, it becomes possible to set and adjust the element, which is to be fastened, even hours after the mortar composition is introduced into the borehole and to bring about the curing of the mortar composition within seconds up to a few minutes by briefly heating the surface of the mortar.

Moreover, the inventive mortar composition enables fillers, which are required in order to attain high load values, to be incorporated. At the same time, the surprisingly high frontal velocity of the inventive mortar composition of at least 10 cm/min is not affected by the use of fillers.

Finally, with the inventive mortar composition, it is possible, not only to bring about the frontal polymerization downwards in the direction of gravity, but also in a horizontal or vertically upward direction. In this way, by appropriately adjusting the viscosity of the mortar composition, it is possible to fill boreholes, which are present in ceilings and open up downward, with the mortar composition, to introduce the fastening elements and to trigger the curing by thermal initiation.

Pursuant to the invention, the initiation of the polymerization of the mortar composition takes place here preferably by pointwise or two-dimensional heating of the surface layer with the help of a flame, a soldering iron tip, a hot air blower, a flash/laser beam, an induction furnace or by electrical resistance heating, for example, with the help of a hot wire of a resistance heater or the like, or in situ by a chemical reaction or by introducing heat into the interior of the mortar composition over a heat-conducting fastening element.

The frontal velocity, that is, the velocity of the polymerization front moving through the mortar composition, is determined by measuring the course of the temperature in the mortar composition in a defined annular gap as a function of time. The exact determination of the frontal velocity will still be explained in greater detail below.

BRIEF DESCRIPTION OF THE DRAWING

In the following, the invention is described in greater detail by means of the attached drawing, in which the only

Figure 1:
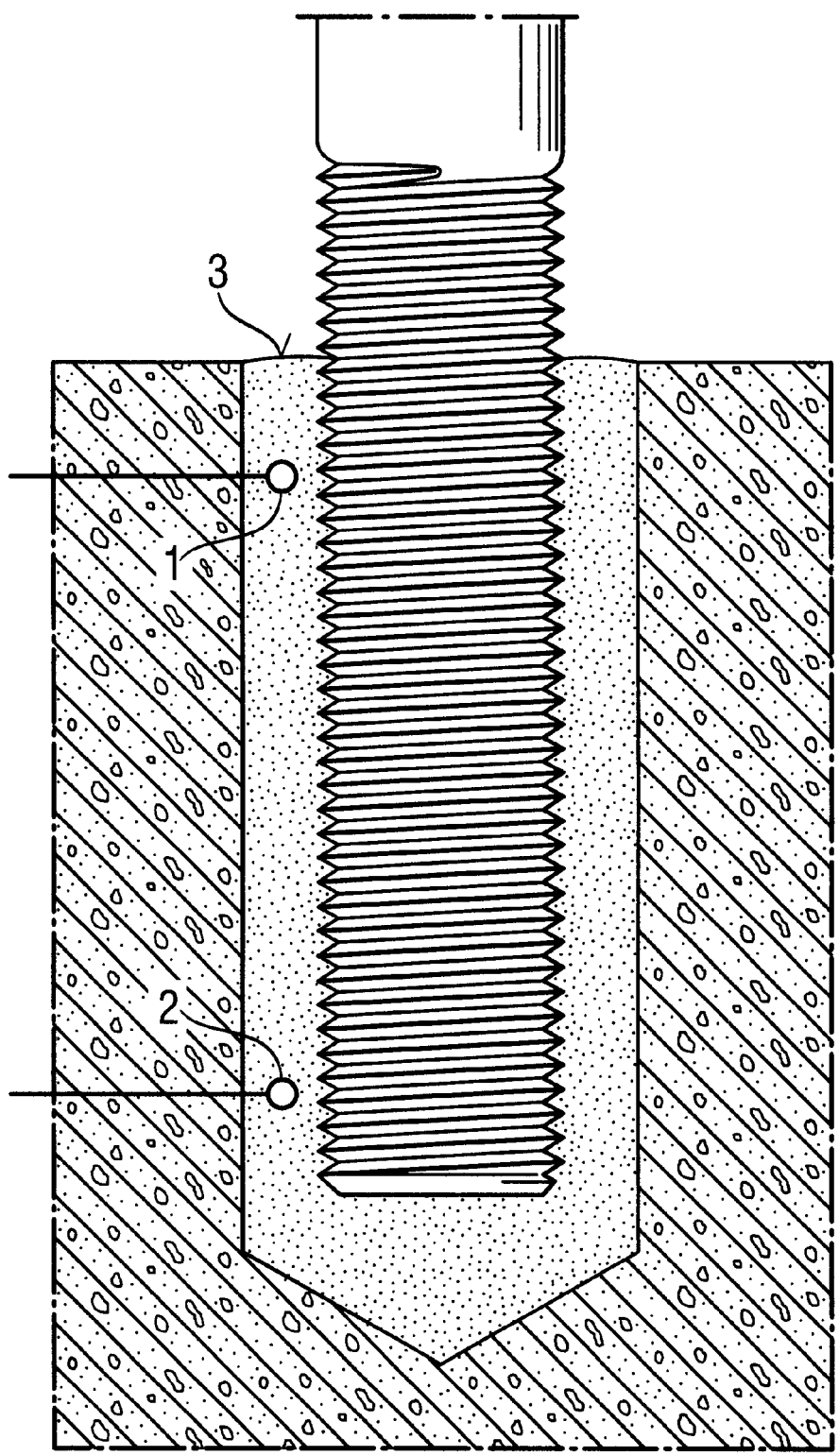
FIG. 1 shows a diagrammatic representation of the measurement arrangement for determining the frontal velocity.

Preferably, the curing of the inventive mortar composition results from the free radical polymerization and/or polyaddition of the monomer or monomers and/or of the curable resin or resins.

The polymerization initiators and polymerization accelerators for the polymerizable monomer and the curing accelerator for the curable resin, used for this polymerization or polyaddition, are compounds, which are activated and/or released thermally at a temperature above 30° C., so that they then bring about the curing of the polymerizable monomers or curable resins. Moreover, these polymerization initiators or accelerators and curing accelerators either have a self-accelerating decomposition temperature SADT, of at least 30° C. and preferably of 55° C. to 80° C. or, if they have an SADT below 30° C., are desensitized by appropriate encapsulation in enveloping materials in such a manner, that they become active only when heated to a temperature above 30° C. with appropriate softening or reaction of the enveloping material. For example, they can be microencapsulated or bound chemically, for example, coordinatively. A special example is the fixation to a polymer which, above the boundary temperature, releases a metal, such as cobalt, which initiates the decomposition of a peroxide polymerization initiator. Correspondingly, the desired initiation temperature of about 30° C. can be set selectively by a suitable combination, known to the expert, of polymerization initiators and polymerization accelerators or curing accelerators with corresponding inhibitors.

The polymerizable monomers, used pursuant to the invention, are preferably selected from:

acrylates, such as 2-(2-ethoxyethoxy)ethyl acrylate (EOEOEA), tetrahydrofurfuryl acrylate (THFA), lauryl acrylate, phenoxyethyl acrylate, isodecyl acrylate, tridecyl acrylate, ethoxylated nonylphenyol acrylate, isobornyl acrylate (IBOA), ethoxylated bisphenol A diacrylate, polyethyleneglycol diacrylate (PEGDA), alkoxylated diacrylate, propoxylated neopentylglycol diacrylate (NPGPODA), ethoxylated neopentylglycol diacrylate (NPGEODA), dihydroxyhexane diacrylate (HDDA), tetraethyleneglycol diacrylate (TTEGDA), triethyleneglycol diacrylate (TIEGDA), tripropyleneglycol diacrylate, (TPGDA), dipropyleneglycol diacrylate (DPGDA), ditrimethylolpropane tetraacrylate (DiTMPTTA), tris-(2-hydroxyethyl)-isocyanurate triacrylate (THEICTA), dipentaerythritol pentaacrylate (DiPEPA), ethoxylated trimethylolpropane triacrylate (TMPEOTA), propoxylated trimethylolpropane triacrylate (TMPPOTA), ethoxylated pentaerythritol tetraacrylate (PPTTA), propoxylated glyceryl triacrylate (GPTA), pentaerythritol tetraacrylate (PETTA), trimethylolpropane triacrylate (TMPTA) and modified pentaerythritol triacrylate;

methacrylates, such as allyl methacrylate (AMA), tetrahydrofurfuryl methacrylate (THFMA), phenoxyethyl methacrylate, isobornyl methacrylate, triethyleneglycol dimethacrylate (TIEGDMA), ethyleneglycol dimethacrylate (EGDMA), tetraethyleneglycol dimethacrylate (TTEGDMA), polyethyleneglycol dimethacrylate (PEGDMA), butanediol dimethacrylate (BDDMA), diethyleneglycol dimethacrylate (DEGDMA), dihydroxyhexane dimethacrylate (HDDMA), polyethyleneglycol dimethacrylate (PEG 600 DMA), butyleneglycol dimethacrylate (BGDMA), ethoxylated bisphenol A dimethacrylate, trimethylolpropane trimethacrylate (TMPTMA); and/or mono or higher functional oligomers or prepolymers of acrylates or methacrylates, such as polyester and/or polyether (meth)acrylates, optionally fatty acid-modified bisphenol epoxy (meth)acrylates, epoxidized soybean oil methacrylates, epoxy novolak (meth) acrylates, aromatic and/or aliphatic (meth)acrylate oligomers, epoxy (meth)acrylates, amine-modified polyether (meth)acrylate oligomers, aromatic and/or aliphatic urethane (meth)acrylates.

In accordance with a first preferred embodiment of the invention, the mortar composition contains a) 10 to 98% by weight of at least one compound (A), which has at least one polymerizable vinyl group, b) 1 to 30% by weight of at least one polymerization initiator (B), which can be activated thermally at a temperature above 30° C. and/or liberated thermally, for the vinyl compound (A) with a self-acceleration decomposition temperature (SADT) of at least 30° C., c) 1 to 60% by weight of at least one filler (C)

d) 0 to 10% by weight of at least one polymerization accelerator (D)

e) 0 to 10% by weight of at least one thickening agent (V).

This mortar composition, in a particularly preferred manner, contains acrylic acid, methacrylic acid, an acrylate ester such as n-butyl acrylate or 1,6-dihydroxyhexane diacrylate, a (meth)acrylate ester, such as methyl methacrylate or triethyleneglycol dimethacrylate, diethyleneglycol dimethacrylate, acrylamide, methacrylamide, methylene diacrylamide, styrene, vinyl acetate, divinylbenzene, a transition metal nitrate/acrylamide complex, an oligomeric aliphatic urethane (meth)acrylate, epoxy methacrylate, an ether methacrylate, diethyleneglycol dimethacrylate, triethyleneglycol dimethacrylate, trimethylolpropane trimethacrylate, trimethylolpropane triacrylate, pentaerythritol tetraacrylate, polyester (meth)acrylate, alkyl vinyl ether and/or mixtures thereof as compound (A) having at least one polymerizable vinyl group, that is, as polymerizable vinyl compound (A).

Examples of the alkyl vinyl ethers, which are also suitable as reactive diluents and as carriers for the polymerization initiator, are ethyl vinyl ether, n-butyl vinyl ether, isobutyl vinyl ether, octadecyl vinyl ether, cyclohexyl vinyl ether, dihydroxybutane divinyl ether, hydroxybutyl vinyl ether, cyclohexane dimethanol monovinyl ether, diethyleneglycol divinyl ether, triethyleneglycol divinyl ether, n-propylvinyl vinyl ether, isopropyl vinyl ether, dodecyl vinyl ether, diethyleneglycol monovinyl ether, cyclohexane dimethanol divinyl ether, trimethylolpropane trivinyl ether and vinyl ether, which can be obtained, for example, by the addition of acetylene to alcohols, as well as oligomers and polymers, which contain vinyl ether groups and are obtained, for example, by the addition of acetylene to hydroxyl group-containing oligomers and/or polymers or by the reaction of alkyl vinyl ethers with reactive monomers, oligomers and/or polymers, especially by the reaction of isocyanates and isocyanate prepolymers with hydroxy-functional alkyl vinyl ethers.

In the case of this mortar composition, the polymerization initiator (B) preferably is a peroxide, especially a dialkyl peroxide, such as di-t-butyl peroxide, a diacyl peroxide, such as dibenzoyl peroxide, a hydroperoxide, such as t-butyl hydroperoxide or cumene hydroperoxide, a percarboxylate ester, such as butyl perbenzoate, a perketal, such as 1,1-di-t-butyl-peroxy-3,3,5-trimethylcyclohexane, sodium persulfate, potassium persulfate, ammonium persulfate and/or an azo compound, such as azo bisisobutyronitrile with a self-accelerating decomposition temperature (SADT) of at least 30° C. and preferably of 55° C. to 80° C.

Furthermore, in the event that a polymerization accelerator (D) is used, preferably such a one is employed, which can be activated and/or released thermally at a temperature above 30° C. and preferably at a temperature ranging from 55° C. to 80° C. Such a polymerization accelerator (D) is, in particular, an amine, preferably a tertiary amine, such as dimethylaniline, a hetero polyacid and/or a metal compound, such as a cobalt compound.

As thickening agent (V), the above mortar composition preferably contains silica and/or a silicate, such as laponite, montmorillonite or bentonite.

In accordance with a second preferred embodiment of the invention, the mortar composition contains a) 30 to 98% by weight of at least one curable epoxide resin (E), b) 1 to 10% by weight of at least one curing accelerator (G) for the epoxide resin, which can be activated thermally and/or released thermally at a temperature above 30° C., c) 1 to 60% by weight of at least one filler (C), d) 0 to 50% by weight of at least one curing agent (H), e) 0 to 50% by weight of at least one reactive diluent (R) and f) 0 to 10% by weight of at least one thickening agent (V).

In accordance with a particularly preferred embodiment, the mortar composition contains, as curable epoxide resin (E), an epoxide resin based on bisphenol and/or novolak, preferably a bisphenol A epoxide resin, a diglycidyl ether of bisphenol A, a bisphenol F epoxide resin, a novolak epoxide resin or an aliphatic epoxide resin.

The curing accelerators (G), used according to this embodiment, preferably are a tertiary amine, such as dimethylbenzylamine, an imidazole, such as an imidazole metal complex, a phenol, such as hydroquinone, a novolak, a sulfonium salt, an iodonium salt, a Lewis acid and/or a Lewis acid complex, especially a boron trichloride/amine complex or ether complex. In the event that a curing agent (H) is used, a Mannich base, an amine, an imidazole and/or an acid anhydride preferably are employed.

The reactive diluent (R), optionally used in the case of this embodiment, preferably is a glycidyl ether of an aliphatic alcohol or phenol, especially butyl glycidyl ether, dihydroxyhexane diglycidyl ether, trimethylolpropane triglycidyl ether or phenyl glycidyl ether or also alkyl vinyl ethers, as defined above.

In this embodiment also, it is possible to use silica and/or a silicate, laponite, montmorillonite or bentonite as thickening agent (V).

As filler (C), the inventive mortar composition preferably contains quartz sand, powdered quartz, pyrogenic silica, corundum, glass spheres, a carbonate, a sulfate, cement, a metal powder or granulate, a hydrated layer silicate, such as montmorillonite, hectorite and bentonite and/or an organic filler.

Moreover, for adjusting the viscosity, it is possible to incorporate additionally an inert solvent and/or diluent (L), such as a plasticizer, especially a dialkyl phthalate or dialkyl adipate and/or dimethylformamide.

A further object of the invention is a method for fastening tie bars, reinforcing steel or the like in solid substrates. The method consists of introducing the mortar composition, defined pursuant to the invention above, into a dowel hole, which has previously been provided in the solid substrate, to which the fastening element is to be affixed. Subsequently, the tie bar, the reinforcing steel or a similar fastening element is introduced into the dowel hole filled with mortar composition, whereupon the frontal polymerization is initiated by heating the surface layer of the mortar composition to a temperature above the reaction temperature of the polymerization initiator, polymerization accelerator and/or curing agent. In this connection, the polymerization of the mortar composition can be initiated by the pointwise or two-dimensional heating of the surface layer or in the interior of the mortar composition. While it is possible to initiate the curing of the mortar composition by introducing heat over a heat-conducting fastening element, it is preferred pursuant to the invention, to heat the surface layer of the mortar composition pointwise or two-dimensionally with the help of a flame, a soldering iron tip, a hot air blower, a flash, a laser beam, an induction furnace, by electrical resistance heating, such as a heating wire, and/or with the help of a chemical reaction in situ.

For carrying out the inventive method, the dimensions of borehole and tie bar are selected in accordance with the state of the art for injection systems. In this connection, an amount of the inventive mortar composition is introduced into the prepared borehole so that the annular gap is filled up completely after the setting of the element, which is to be fastened. Pursuant to the invention, an adjustment of the element is possible, since the mortar composition cures only after the surface has been heated briefly for a few seconds at least to 80° C. In so doing, a polymerization front is formed, which progresses at a very high speed of at least 10 cm/min through the annular gap, as a result of which the element is fixed in the cured mortar composition.

In this way, it is possible to introduce a large number of fastening elements into prepared dowel holes, which are already filled with mortar composition and, after fastening and aligning all fastening elements, to trigger the polymerization of the mortar composition by means of the thermal initiation addressed especially by the pointwise or two-dimensional heating of the surface layer of the mortar composition and to bring about a rapid and complete and, above all, uniform curing of the mortar composition and, with that, achieve a high uniformity and constancy of strength of the set fastening elements.

The following examples serve to explain the invention further.

EXAMPLE 1

Measurement of the Frontal Velocity

The frontal velocity is measured in the interior of an annular gap, as shown diagrammatically in FIG. 1. This annular gap is defined by a borehole with an internal diameter of 14 mm in concrete and a tie bar of galvanized steel with an external diameter of 12 mm. Thermocouples, with which the change in temperature can be measured as a function of time, are provided at a defined distance at the measurement points 1 and 2. The mortar composition, which is to be investigated, is introduced at room temperature (23° C.) into the dry borehole, from which drilling dust has been removed. After the tie bar is set, the polymerization of the mortar composition, which has a starting temperature of 150° C., is initiated by igniting a point of the mortar surface by means of a soldering iron.

The frontal velocity (the velocity of the polymerization front migrating from measurement point 1 to measurement point 2) is calculated by the ratio of the distance between the measurement points 1 and 2 to the time measured, as the temperature maximum passes from measurement point 1 to measurement point 2.

Pursuant to the invention, the frontal velocity is at least 10 cm/min and preferably 20 cm/min and more.

EXAMPLE 2

A mortar composition is prepared from the following components:

77.5% by weight of pentaerythritol tetraacrylate (PETTA)
5.0% by weight of a perketal mixture as polymerization initiator
7.5% by weight of quartz sand
7.5% by weight of quartz
2.5% by weight of pyrogenic silica (Cab-O-Sil TS 720)

The mortar composition, obtained by mixing the above components, is introduced into a borehole in concrete of quality C20 with a depth of 130 mm and a diameter of 14 mm. After a tie bar with an external diameter of 12 mm is introduced and the polymerization initiated by heating to a temperature of 150° C. with the help of a soldering iron, complete curing of the composition takes place within a period of 30 seconds. The pull-out force of the anchor bar after the curing is about 40 kN.

EXAMPLE 3

A mortar composition is prepared by mixing the following components:

| | |
|---|---|
| 44.0% | pentaerythritol tetraacrylate |
| 9.0% | trimethylolpropane trivinyl ether |
| 19.0% | trimethylolpropane trimethacrylate |
| 2.0% | pyrogenic silica |
| 10.0% | quartz sand |
| 13.0% | dibenzoyl peroxide (20% on plaster) |
| 3.0% | polymerization initiator, which can be activated thermally |

After the tie bar is introduced into a borehole, previously filled with mortar composition in the manner described in Example 2, the polymerization is initiated by heating with the help of an electric heating wire and leads to a complete curing of the composition within a period of less than 25 seconds. The pull-out force of the tie bar after the curing is about 45 kN.

What is claimed is:

1. A mortar composition, curable by frontal polymerization after heat initiation, wherein are contained a) at least one polymerizable monomer and/or at least one curable resin, b) at least one polymerization initiator, which can be activated thermally and/or released at a temperature above 30° C., for the polymerizable monomer and/or curing accelerator for the curable resin and c) optionally at least one filler, the nature and amount of polymerizable monomer or curable resin and polymerization initiator or curing accelerator being selected so that a polymerization front velocity of at least 10 cm/min results after the polymerization is initiated.

2. The mortar composition of claim 1, wherein the curing of the mortar composition is accomplished by the free radical polymerization and/or polyaddition of the monomer or monomers and/or of the curable resin or resins.

3. The mortar composition of claim 1, wherein are contained a) 10 to 98% by weight of at least one compound (A), which has at least one polymerizable vinyl group, b) 1 to 30% by weight of at least one polymerization initiator (B), which can be activated thermally and/or released thermally at a temperature above 30° C., for the vinyl compound (A) with a self-acceleration decomposition temperature (SADT) of at least 30° C., c) 1 to 60% by weight of at least one filler (C), d) 0 to 10% by weight of at least one polymerization accelerator (D), e) 0 to 10% by weight of at least one thickening agent (V).

4. The mortar composition of claim 3 wherein, as polymerizable vinyl compound (A), acrylic acid, methacrylic acid, an acrylate ester such as n-butyl acrylate or 1,6-dihydroxyhexane diacrylate, a (meth)acrylate ester, such as methyl methacrylate or triethyleneglycol dimethacrylate, diethyleneglycol dimethacrylate, acrylamide, methacrylamide, methylene diacrylamide, styrene, vinyl acetate, divinylbenzene, a transition metal nitrate/acrylamide complex, an oligomeric aliphatic urethane (meth)acrylate, epoxy methacrylate, an ether methacrylate, diethyleneglycol dimethacrylate, triethyleneglycol dimethacrylate, trimethylolpropane trimethacrylate, trimethylolpropane triacrylate, pentaerythritol tetraacrylate, polyester (meth)acrylate, alkyl vinyl ether and/or mixtures thereof as compound (A) having at least one polymerizable vinyl group, that is, as polymerizable vinyl compound (A), is contained.

5. The mortar composition of claim 3 wherein, as polymerization initiator (B), a peroxide, especially a dialkyl peroxide, such as di-t-butyl peroxide, a diacyl peroxide, such as dibenzoyl peroxide, a hydroperoxide, such as t-butyl hydroperoxide or cumene hydroperoxide, a percarboxylate ester, such as butyl perbenzoate, a perketal, such as 1,1-di-t-butyl-peroxy-3,3,5-trimethylcyclohexane, sodium persulfate, potassium persulfate, ammonium persulfate and/or an azo compound, such as azo bisisobutyronitrile with a self-accelerating decomposition temperature (SADT) of at least 30° C. and preferably of 55° C. to 80° C., is contained.

6. The mortar composition of claim 3, wherein a polymerization accelerator (D) is contained, which can be activated thermally at a temperature above 30° C. and/or is released thermally.

7. The mortar composition of claim 3 wherein, as polymerization accelerator (D), an amine, preferably a tertiary amine, such as dimethylaniline, a hetero polyacid and/or a metal compound, such as a cobalt compound, is contained.

8. The mortar composition of claim 3 wherein, as thickening agent(V), silica and/or a silicate, such as laponite or bentonite, is contained.

9. The mortar composition of claim 1, wherein are contained a) 30 to 98% by weight of at least one curable epoxide resin (E), b) 1 to 10% by weight of at least one curing accelerator (G) for the epoxide resin, which can be activated and/or released thermally at a temperature above 30° C., c) 1 to 60% by weight of at least one filler (C), d) 0 to 50% by weight of at least one curing agent (H), e) 0 to 50% by weight of at least one reactive diluent (R) and f) 0 to 10% by weight of at least one thickening agent (V).

10. The mortar composition of claim 9 wherein, as curable epoxide resin (E), an epoxide resin based on bisphenol and/or novolak, preferably a bisphenol A epoxide resin, a diglycidyl ether of bisphenol A, a bisphenol F epoxide resin, a novolak epoxide resin or an aliphatic epoxide resin, is contained.

11. The mortar composition of claim 9 wherein, as curing accelerator (G), a tertiary amine, such as dimethylbenzylamine, an imidazole, such as an imidazole metal complex, a phenol, such as hydroquinone, a novolak, a sulfonium salt, an iodonium salt, a Lewis acid and/or a Lewis acid complex, especially a boron trichloride/amine complex or ether complex with an activation temperature of at least 30° C. and preferably of 55° C. to 80° C., is contained.

12. The mortar composition of claim 9 wherein, as curing agent (H), a Mannich base, an amine, an imidazole and/or an acid anhydride are contained.

13. The mortar composition of claim 9 wherein, as reactive diluent (R), a glycidyl ether of an aliphatic alcohol or of a phenol, especially butyl glycidyl ether, dihydroxyhexane diglycidyl ether, trimethylolpropane triglycidyl ether or phenyl glycidyl ether or several alkyl vinyl ethers, is contained.

14. The mortar composition of claim 9 wherein, as thickening agent (V), silica and/or a silicate, such as laponite or bentonite, is contained.

15. The mortar composition of claim 1 wherein, as filler (C), quartz sand, powdered quartz, pyrogenic silica, corundum, glass spheres, a carbonate, a sulfate, cement, a metal powder or granulate, a hydrated layer silicate, such as montmorillonite, hectorite, bentonite and/or an organic filler, is contained.

16. The mortar composition of claim 1 wherein an inert solvent and/or diluent (L) is additionally contained.

17. The mortar composition of claim 16, wherein, as inert solvent (L), a plasticizer, especially a dialkyl phthalate or dialkyl adipate and/or dimethylformamide is contained.

18. A method for fastening tie bars, reinforcing steel or the like in solid substrates, wherein the mortar composition of at least one of the preceding claims is brought into the dowel hole, the tie bar, the reinforcing steel or the like is introduced and the frontal polymerization initiated by heating the surface layer of the mortar composition to a temperature above the reaction temperature of the polymerization initiator, polymerization accelerator and/or curing agent.

19. The method of claim 18, wherein the polymerization of the mortar composition is initiated in the interior of the mortar composition or by the pointwise or two-dimensional heating of the surface layer.

20. The method of claim 18, wherein the polymerization of the mortar composition is initiated by introducing heat over the fastening element.

21. The method of claim 18, wherein the pointwise or two-dimensional heating is accomplished with the help of a flame, a soldering iron tip, a hot air blower, an induction furnace, a flash, a laser beam, by electrical resistance heating, and/or in situ by a chemical reaction.

* * * * *